US009466836B2

(12) United States Patent
Kim

(10) Patent No.: US 9,466,836 B2
(45) Date of Patent: Oct. 11, 2016

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventor: Su-Jin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/702,544

(22) Filed: May 1, 2015

(65) Prior Publication Data
US 2016/0043397 A1     Feb. 11, 2016

(30) Foreign Application Priority Data

Aug. 11, 2014   (KR) .................. 10-2014-0103980

(51) Int. Cl.
| | |
|---|---|
| *H01M 4/58* | (2010.01) |
| *H01M 10/052* | (2010.01) |
| *H01M 4/36* | (2006.01) |
| *C01B 25/45* | (2006.01) |
| *H01M 4/13* | (2010.01) |

(Continued)

(52) U.S. Cl.
CPC ............ *H01M 4/5825* (2013.01); *C01B 25/45* (2013.01); *H01M 4/13* (2013.01); *H01M 4/131* (2013.01); *H01M 4/139* (2013.01); *H01M 4/1391* (2013.01); *H01M 4/366* (2013.01); *H01M 4/485* (2013.01); *H01M 4/525* (2013.01); *H01M 10/052* (2013.01); *C01P 2006/40* (2013.01); *H01M 2220/30* (2013.01)

(58) Field of Classification Search
CPC .... H01M 4/5825; H01M 4/366; H01M 4/13; H01M 4/131; H01M 4/139; H01M 4/1391; H01M 4/485; H01M 4/525
See application file for complete search history.

(56) References Cited

U.S. PATENT DOCUMENTS

| | | |
|---|---|---|
| 2003/0170542 A1 | 9/2003 | Barker et al. |
| 2011/0008678 A1 | 1/2011 | Li et al. |

(Continued)

FOREIGN PATENT DOCUMENTS

| | | |
|---|---|---|
| EP | 1 936 721 A1 | 6/2008 |
| JP | 2008-226463 A | 9/2008 |
| KR | 10-0634144 B1 | 10/2006 |
| KR | 10-2012-0046612 A | 5/2012 |

OTHER PUBLICATIONS

English machine translation of Japanese Publication No. JP 2008-226463, dated Sep. 25, 2008, 34 pages.

(Continued)

*Primary Examiner* — Jane Rhee
(74) *Attorney, Agent, or Firm* — Lewis Roca Rothgerber Christie LLP

(57) ABSTRACT

A positive active material for a rechargeable lithium battery including a core including a compound being capable of intercalating and deintercalating lithium and the lithium metal phosphate positioned on the surface of the core, the lithium metal phosphate is represented by Chemical Formula 1, a method of preparing the same, and a rechargeable lithium battery including the same.

$$Li_{1+(x+y)}A_xB_yTi_{2-(x+y)}(PO_4)_3 \quad \text{Chemical Formula 1}$$

In Chemical Formula 1, A, B, x and y are the same as defined in the detailed description.

15 Claims, 15 Drawing Sheets

(51) Int. Cl.
*H01M 4/131* (2010.01)
*H01M 4/139* (2010.01)
*H01M 4/1391* (2010.01)
*H01M 4/485* (2010.01)
*H01M 4/525* (2010.01)

(56) References Cited

U.S. PATENT DOCUMENTS

| 2012/0135305 | A1 | 5/2012 | Kim et al. |
| 2012/0308893 | A1* | 12/2012 | Fujino ............... C01B 25/37 |
| | | | 429/221 |
| 2013/0183579 | A1 | 7/2013 | Kim et al. |
| 2014/0106222 | A1 | 4/2014 | Park et al. |

OTHER PUBLICATIONS

Korean Patent Abstracts Publication 10-2001-0080496 A, dated Aug. 22, 2001, for KR 10-0634144 B1, 1 page.

Morimoto, Hideyuki et al., "Preparation of lithium ion conducting solid electrolyte of NASICON-type $Li_{1+x}Al_xTi_{2-x}(PO_4)_3$ (x=0.3) obtained by using the mechanochemical method and its application as surface modification materials of $LiCoO_2$ cathode for lithium cell", Journal of Power Sources, May 18, 2013, pp. 636-643, vol. 240.

Wu, Xianming et al., "Synthesis and characterization of $Li_{1.3}Al_{0.3}Ti_{1.7}(PO_4)_3$-coated $LiMn_2O_4$ by wet chemical route", Rare Metals, Apr. 2009, p. 122 (2 pages), vol. 28.

EPO Search Report dated Dec. 15, 2015, for corresponding European Patent application 15170701.5, (8 pages).

Vidal-Abarca, C., et al, *The influence of iron substitution on the electrochemical properties of $Li_1-xTi_{2+x}Fe_x(PO4)_3/C$ composites as electrodes for lithium batteries*, Journal of Materials Chemistry, vol. 22, No. 40, Jan. 1, 2012, pp. 21602-21607, XP 55234472.

Aatiq, A., et al, *Structural and lithium intercalation studies of $Mn_{(0.5-x)}Ca_xTi_2(PO_4)_3$ phases ($0 \leq x \leq 0.50$)*, Solid State Ionics, vol. 150, No. 3-4, Oct. 1, 2002, pp. 391-405, XP 4379010.

Wu, X.M., et al., *Synthesis and characterization of $Li_{1.3}Al_{0.3}Ti_{1.7}(PO_4)_3$-coated $LiMn_2O_4$ by wet chemical route*, Rare Metals, vol. 28, No. 2, Mar. 15, 2009, pp. 122-126, XP 55212158.

* cited by examiner

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2014-0103980, filed in the Korean Intellectual Property Office on Aug. 11, 2014, the entire content of which is incorporated herein by reference.

BACKGROUND

1. Field

A positive active material for a rechargeable lithium battery, a method of preparing the same, and a rechargeable lithium battery including the same are disclosed.

2. Description of the Related Art

A rechargeable lithium battery has recently drawn attention as a power source for small portable electronic devices. It uses an organic electrolyte solution and thereby, has twice or more as high discharge voltage as a related art battery using an alkali aqueous solution and accordingly, has a high energy density.

This rechargeable lithium battery is used by injecting an electrolyte into an electrode assembly including a positive electrode including a positive active material that can intercalate and deintercalate lithium, and a negative electrode including a negative active material that can intercalate and deintercalate lithium.

For the positive active material, a composite metal oxide such as $LiCoO_2$, $LiMn_2O_4$, $LiNiO_2$, $LiNi_{1-x}Co_xO_2$ ($0<x<1$), $LiMnO_2$, and the like has been used. $LiNiO_2$ among the positive active materials has high charge capacity but is difficult to synthesize, while an Mn-based active material such as $LiMn_2O_4$, $LiMnO_2$, and the like is easy to synthesis, relatively inexpensive, and less of an environmental contaminate, but $LiMnO_2$ has small capacity. In contrast, $LiCoO_2$ shows electrical conductivity of about $10^{-2}$ S/cm to 1 S/cm at room temperature, high battery voltage, and excellent electrode characteristics and thus, has been widely used; but $LiCoO_2$ has low stability during high-rate charge and discharge.

Accordingly, developments for a substitute material because of electrochemical performance and stability due to the positive active material have been actively made.

SUMMARY

An aspect of an embodiment is directed toward a positive active material for a rechargeable lithium battery having improved electrochemical performance (e.g., high cycle-life characteristic and rate capability, excellent stability, etc.).

Another aspect of an embodiment is directed toward a method of preparing the positive active material.

Another aspect of an embodiment is directed toward a rechargeable lithium battery including the positive active material.

One embodiment provides a positive active material for a rechargeable lithium battery including a core including a compound being capable of intercalating and deintercalating lithium; and the lithium metal phosphate positioned on the surface of the core, wherein the lithium metal phosphate is different from the compound being capable of intercalating and deintercalating lithium and is represented by Chemical Formula 1.

$$Li_{1+(x+y)}A_xB_yTi_{2-(x+y)}(PO_4)_3 \quad \text{Chemical Formula 1}$$

In Chemical Formula 1, A is a tetravalent element, B is a divalent element, $0<x\leq1$, and $0<y\leq1$.

In Chemical Formula 1, A is Zr, Nb, Mo, Ce, Cr, Ge, Ru, Se, Sn, Ta, Tb, V, W or a combination thereof, and B is Mg, Zn, Cu, Ca, Sr, Ba, Ca, Cd, Fe, Mn, Nd, Yb, Zn, or a combination thereof.

In Chemical Formula 1, $0<x<1$ and $0<y<1$.

The lithium metal phosphate may be attached to the surface of the core in a shape of an island.

The lithium metal phosphate may be included in an amount of about 0.01 parts by weight to about 20 parts by weight based on 100 parts by weight of the compound being capable of intercalating and deintercalating lithium.

The compound being capable of intercalating and deintercalating lithium may be a nickel-based oxide, and the nickel-based oxide may be a lithium nickel cobalt oxide, a lithium nickel cobalt aluminum oxide, a lithium nickel cobalt manganese oxide, or a combination thereof.

Another embodiment provides a method of preparing the positive active material for a rechargeable lithium battery that includes mixing a lithium-containing compound, a tetravalent element-containing compound, a divalent element-containing compound, a titanium-containing compound, a phosphate salt and a solvent to prepare a solution including the lithium metal phosphate represented by Chemical Formula 1; adding a compound being capable of intercalating and deintercalating lithium to the solution including the lithium metal phosphate to obtain a mixture; and drying and firing the mixture.

Another embodiment provides a rechargeable lithium battery including the positive active material.

Other embodiments are included in the following detailed description.

The positive active material according to one or more embodiments may realize a rechargeable lithium battery having improved electrochemical performance (e.g., high cycle-life characteristic and rate capability, excellent stability, etc.).

DETAILED DESCRIPTION

Figure 1:
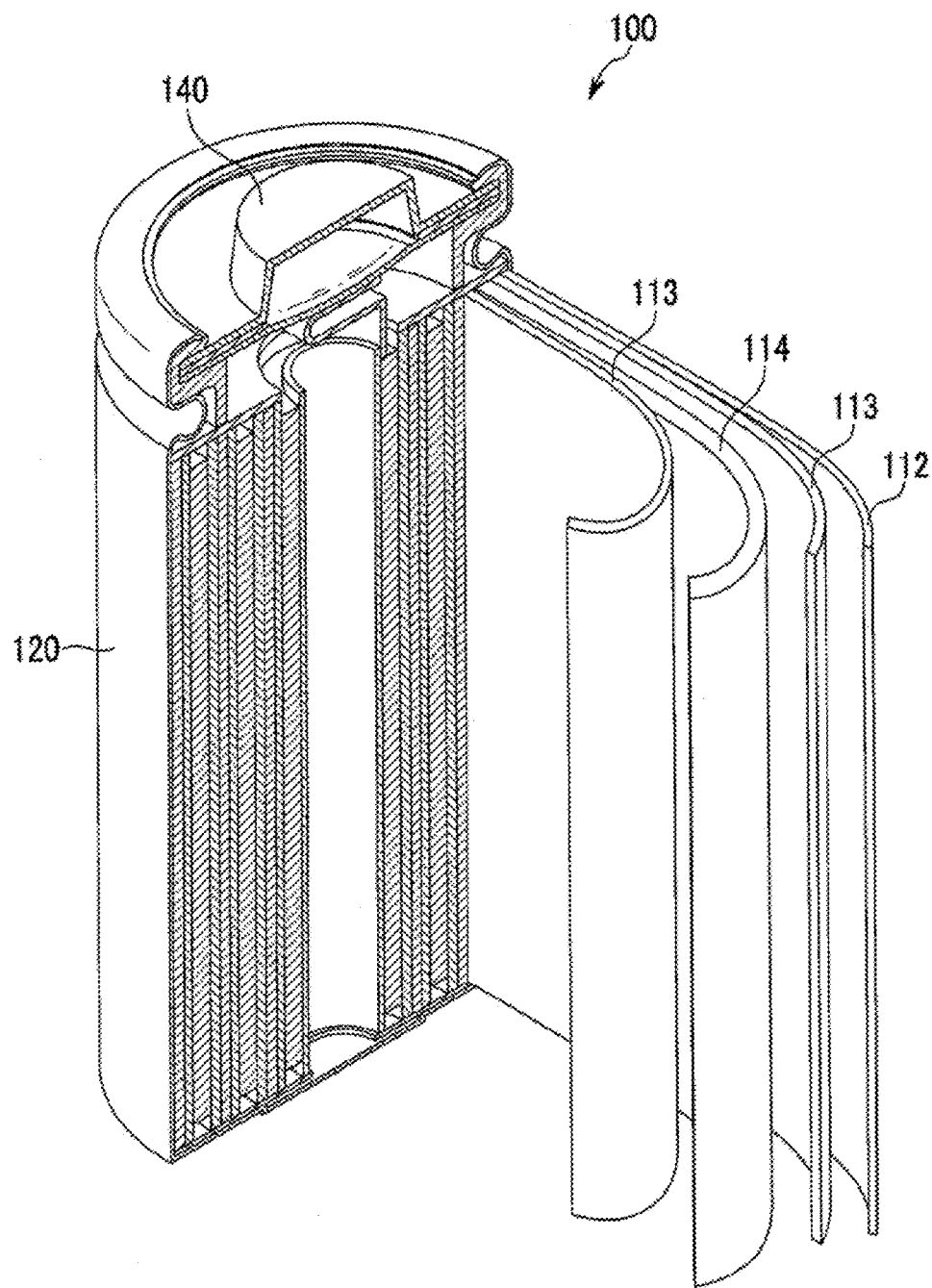
FIG. 1 is a schematic view showing a rechargeable lithium battery according to one embodiment.

Hereinafter, embodiments are described in more detail. However, these embodiments are exemplary, and this disclosure is not limited thereto. Expressions such as "may" when describing embodiments of the present invention refers to "one or more embodiments of the present invention." Also, the term "exemplary" is intended to refer to an example or illustration. It will be understood that when an element or layer is referred to as being "on", "connected to", "coupled to", "attached to" or "adjacent to" another element or layer, it can be directly on, connected to, coupled to, attached to or adjacent to the other element or layer, or one or more intervening elements or layers may be present. In contrast, when an element or layer is referred to as being "directly on," "directly connected to", "directly coupled to", "directly attached to" or "immediately adjacent to" another element or layer, there are no intervening elements or layers present. As used herein, the term "substantially," "about," and similar terms are used as terms of approximation and not as terms of degree, and are intended to account for the inherent deviations in measured or calculated values that would be recognized by those of ordinary skill in the art. As used herein, the terms "use," "using," and "used" may be considered synonymous with the terms "utilize," "utilizing," and "utilized," respectively.

Hereinafter, a positive active material for a rechargeable lithium battery according to one embodiment is described.

The positive active material according to the present embodiment includes a core including a compound being capable of intercalating and deintercalating lithium and the lithium metal phosphate positioned on the surface of the core.

The lithium metal phosphate is different from the compound being capable of intercalating and deintercalating lithium, and may be specifically represented by Chemical Formula 1.

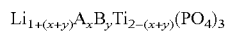

Chemical Formula 1

In Chemical Formula 1, A is a tetravalent element, B is a divalent element, $0<x\leq1$, and $0<y\leq1$.

The lithium metal phosphate represented by the above Chemical Formula 1 is a compound having a NASICON (sodium (Na) Super Ionic Conductor) structure, and has high ion conductivity. When such as a positive active material including lithium metal phosphate positioned on the surface of the core is applied to a rechargeable lithium battery, resistance at the positive electrode interface during an electrochemical reaction may be reduced or minimized and a side reaction between an electrolyte and a positive active material may be suppressed and battery performance such as cycle-life characteristic and rate capability may be improved and/or thermal stability may be ensured.

Specifically, since the lithium metal phosphate includes the tetravalent element and the divalent element, that is, at least two metal elements having different charge amounts from each other, ion conductivity may be further improved. In other words, the metal elements having different charge amounts from each other form vacancy by cation substitution, which improves ion conductivity. Accordingly, resistance decrease at the positive electrode interface may be obtained, and thus electrochemical performance may be improved and simultaneously battery stability may also be improved.

Specifically, the tetravalent element may be Zr, Nb, Mo, Ce, Cr, Ge, Ru, Se, Sn, Ta, Tb, V, W, or a combination thereof, and the divalent element may be Mg, Zn, Cu, Ca, Sr, Ba, Ca, Cd, Fe, Mn, Nd, Yb, Zn, or a combination thereof.

In the above Chemical Formula 1, x may be specifically in the range of $0<x<1$ and y may be specifically in the range of $0<y<1$.

The lithium metal phosphate positioned on the surface of the core may be specifically attached to the surface of the core in a shape of an island.

The lithium metal phosphate may be included in an amount of about 0.01 parts by weight to about 20 parts by weight, for example, about 0.01 parts by weight to about 10 parts by weight, or about 0.1 parts by weight to about 2 parts by weight based on 100 parts by weight of the compound being capable of intercalating and deintercalating lithium. When the lithium metal phosphate is attached to or on the surface of the core within the amount range, a rechargeable lithium battery having improved cycle-life characteristic, rate capability and low temperature characteristic and improved stability may be realized.

The compound being capable of intercalating and deintercalating lithium for the core material may be a composite oxide of lithium and at least one of metal of cobalt, manganese, nickel, or a combination thereof. Among them, a nickel-based oxide may be specifically used. The nickel-based oxide may include a lithium nickel cobalt oxide, a lithium nickel cobalt aluminum oxide, a lithium nickel cobalt manganese oxide, or a combination thereof.

The lithium metal phosphate positioned on the surface of the core includes a tetravalent element and a divalent element as in Chemical Formula 1. Since the tetravalent element and the divalent element have high ion conductivity and a large ion radius, a c-axis value of the lattice parameters of the lithium metal phosphate increases, and thus the lithium metal phosphate may be desirably applied with an active material including nickel (Ni) having a relatively large c-axis length. In other words, such a lithium metal phosphate including the tetravalent element and divalent element having high ion conductivity and large ion radius may increase or maximize resistance decrease while it matches an oxygen layer of the core material including nickel (Ni) at a ratio of 1:1 and may ensure excellent electrochemical performance and stability of the nickel-based oxide due to decrease of a side reaction with an electrolyte. Accordingly, the lithium metal phosphate may be desirably used with a nickel-based oxide as the core material.

Hereinafter, a method of preparing the positive active material for a rechargeable lithium battery according to another embodiment is described.

A method of preparing the positive active material for a rechargeable lithium battery according to the present embodiment includes mixing a lithium-containing compound, a tetravalent element-containing compound, a divalent element-containing compound, a titanium-containing compound, a phosphate salt and a solvent to prepare a solution including the lithium metal phosphate represented by the above Chemical Formula 1; adding a compound being capable of intercalating and deintercalating lithium to the solution including the lithium metal phosphate to obtain a mixture; and drying and firing the mixture.

The lithium-containing compound may include lithium acetate hydrate, lithium nitrate hydrate, and/or the like. The tetravalent element-containing compound may include acetate, nitrate, acetylacetonate, and/or the like of the tetravalent element. The divalent element-containing compound may include acetate, nitrate, acetylacetonate, and/or the like of the divalent element. The titanium-containing compound may include a titanium isopropoxide, a titanium butoxide, titanium acetylacetonate, and/or the like; and the phosphate salt may include $NH_4H_2PO_4$, $(NH_4)_2HPO_4$, $Li_3PO_4$, and/or the like. The solvent may be water, ethanol, isopropylalcohol, acetone, acetylacetonate, ethylene glycol, butanol, and/or the like.

Each raw material may be mixed in an appropriate mole ratio to obtain a stoichiometric ratio of the lithium metal phosphate represented by the above Chemical Formula 1.

The mixture may be dried at about 100° C. to about 150° C.

The mixture may be fired at about 600° C. to about 1100° C., for example, about 650° C. to about 950° C. The firing may be performed under air, or an inert gas atmosphere $N_2$ and the like for about 1 hour to about 12 hours. When being fired within the temperature range, a compound having a stable NASICON structure may be obtained.

Hereinafter, a rechargeable lithium battery including the above positive active material according to another embodiment is described with reference with FIG. 1.

FIG. 1 is a schematic view showing a rechargeable lithium battery according to one embodiment.

Referring to FIG. 1, a rechargeable lithium battery 100 according to one embodiment includes a positive electrode 114, a negative electrode 112 facing the positive electrode 114, a separator 113 interposed between the negative electrode 112 and the positive electrode 114, an electrolyte impregnating the separator 113, a battery case 120, and a sealing member 140 sealing the battery case 120.

The positive electrode 114 includes a current collector and a positive active material layer formed on the current collector. The positive active material layer includes a positive active material, binder and optionally a conductive material.

The current collector may use Al, but is not limited thereto.

The positive active material is the same as described above. The positive active material may realize a rechargeable lithium battery having improved electrochemical performance (e.g., high cycle-life characteristic and rate capability, excellent thermal stability, etc.).

The binder improves binding properties of positive active material particles with one another and with a current collector, and specific examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. The conductive material may be one or more of natural graphite; artificial graphite; carbon black; acetylene black; ketjen black; a carbon fiber; a metal powder or metal fiber of a copper, nickel, aluminum, silver, and/or the like; a conductive material such as a polyphenylene derivative; and/or the like.

The negative electrode 112 includes a current collector and a negative active material layer formed on the current collector.

The current collector may be a copper foil, but is not limited thereto.

The negative active material layer includes a negative active material, a binder and optionally a conductive material.

The negative active material includes a material that reversibly intercalates/deintercalates lithium ions, lithium metal, lithium metal alloy, a material being capable of doping and dedoping lithium, a transition metal oxide, or a combination thereof.

The material that reversibly intercalates/deintercalates lithium ions may be a carbon material, and the carbon material may be crystalline carbon, amorphous carbon, or a combination thereof. The crystalline carbon may be non-shaped, or may be sheet, flake, spherical, or fiber shaped natural graphite or artificial graphite. The amorphous carbon may be a soft carbon, a hard carbon, mesophase pitch carbonized products, fired coke, and/or the like. The lithium metal alloy may be an alloy of lithium with a metal of Na, K, Rb, Cs, Fr, Be, Mg, Ca, Sr, Si, Sb, Pb, In, Zn, Ba, Ra, Ge, Al, and/or Sn. The material being capable of doping and dedoping lithium may be Si, $SiO_x$ ($0<x<2$), a Si—C composite, a Si—Y alloy, Sn, $SnO_2$, a Sn—C composite, a Sn—Y, and/or the like, and at least one thereof may be used with $SiO_2$. The element, Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof. The transition metal oxide may be a vanadium oxide, a lithium vanadium oxide, and/or the like.

The binder improves binding properties of negative active material particles with one another and with a current collector, and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material improves electrical conductivity of an electrode. Any electrically conductive material may be used as a conductive material, unless it causes a chemical change. The electrically conductive material may be a carbon-based material (such as natural graphite, artificial graphite, carbon black, acetylene black, ketjen black, a carbon fiber or the like); a metal-based material (such as a metal powder, a metal fiber, or the like of copper, nickel, aluminum, silver, and/or the like); a conductive polymer (such as a polyphenylene derivative or the like); or a mixture thereof.

The negative electrode 112 and the positive electrode 114 are prepared by mixing each active material, a conductive material and a binder in a solvent to prepare an active material composition, and coating the composition on a current collector.

The electrode preparation method is well known, and thus is not described in detail in the present specification. The solvent includes N-methylpyrrolidone and the like, but is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like.

Particularly, when a linear carbonate compound and a cyclic carbonate compound are mixed, a solvent having a high dielectric constant and a low viscosity may be provided. Herein, the cyclic carbonate compound and linear carbonate compound may be mixed together in a volume ratio ranging from about 1:1 to about 1:9.

The ester-based solvent may include, for example methylacetate, ethylacetate, n-propylacetate, dimethylacetate, methylpropionate, ethylpropionate, γ-butyrolactone, decanolide, valerolactone, mevalonolactone, caprolactone, and/or the like. The ether-based solvent may include, for example dibutylether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethyl alcohol, isopropyl alcohol, and the like.

The non-aqueous organic solvent may be used singularly or in a mixture, and when the organic solvent is used in a mixture, the mixture ratio may be controlled in accordance with a desirable battery performance.

The non-aqueous electrolyte solution may further include an overcharge inhibitor additive such as ethylenecarbonate, pyrocarbonate, or the like.

The lithium salt is dissolved in an organic solvent, supplies lithium ions in a battery, basically operates the rechargeable lithium battery, and improves lithium ion transportation between positive and negative electrodes therein.

The lithium salt may be $LiPF_6$; $LiBF_4$; $LiSbF_6$; $LiAsF_6$; $LiN(SO_3C_2F_5)_2$; $LiC_4F_9SO_3$; $LiClO_4$; $LiAlO_2$; $LiAlCl_4$; $LiN(C_xF_{2x+1}SO_2)(C_yF_{2y+1}SO_2)$, wherein, x and y are natural numbers, e.g., an integer of 1 to 20; LiCl; LiI; $LiB(C_2O_4)_2$ (lithium bis(oxalato)borate, LiBOB); or a combination thereof.

The lithium salt may be used in a concentration ranging from about 0.1 M to about 2.0 M. When the lithium salt is included within the above concentration range, an electrolyte solution may have excellent performance and lithium ion mobility due to desired electrolyte conductivity and viscosity.

The separator 113 may include any suitable materials commonly used in the conventional lithium battery as long as there is separation of (e.g., electron or electrical separation of) the negative electrode 112 from the positive electrode 114 and a suitable transporting passage of lithium ion between the negative electrode 112 and the positive electrode 114 is provided. In other words, it may have a low resistance to ion transport and an excellent impregnation for electrolyte solution. For example, it may be selected from glass fiber, polyester, polyethylene, polypropylene, polytetrafluoroethylene (PTFE), and a combination thereof. It may have a form of a non-woven fabric or a woven fabric. For example, for the lithium ion battery, polyolefin-based polymer separator (such as polyethylene, polypropylene or the like) is mainly used (e.g., is used as a major component). In order to ensure the heat resistance or mechanical strength, a coated separator including a ceramic component and/or a polymer material may be used. Selectively, it may have a mono-layered or multi-layered structure.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

(Preparation of Lithium Metal Phosphate)

PREPARATION EXAMPLE 1

Preparation of LZMTP

A mixture obtained by mixing $CH_3COOLi.2H_2O$, $Ti[OCH(CH_3)_2]_4$, $NH_4H_2PO_4$, zirconium acetylacetonate $(C_{20}H_{28}O_8Zr)$ and $Mg(CH_3COO)_2.4H_2O$ in a mole ratio of a final material was mixed with a mixed solvent obtained by mixing water, ethanol and isopropylalcohol (a weight ratio of 8:38:54), thereby preparing a $Li_{1.5}Zr_{0.2}Mg_{0.3}Ti_{1.5}(PO_4)_3$ (LZMTP)-containing solution.

COMPARATIVE PREPARATION EXAMPLE 1

Preparation of LATP

A mixture obtained by mixing $CH_3COOLi.2H_2O$, $Al(NO_3)_3.9H_2O$, $Ti[OCH(CH_3)_2]_4$ and $NH_4H_2PO_4$ in a mole ratio of a final material was mixed with a mixed solvent obtained by mixing water, ethanol and isopropylalcohol (a weight ratio of 8:38:54), thereby preparing a $Li_{1.3}Al_{0.3}Ti_{1.7}(PO_4)_3$ (LATP)-containing solution.

(Preparation of Positive Active Material)

EXAMPLE 1

$LiNi_{1/3}Co_{1/3}Mn_{1/3}O_2$(NCM) was added to the LZMTP-containing solution according to Preparation Example 1, the mixture was dried at 120° C. while being agitated and then, fired at 750° C. for 120 minutes under an inert gas atmosphere, thereby manufacturing the NCM coated with the LZMTP. Herein, the LZMTP was used in an amount of 1 part by weight based on 100 parts by weight of the NCM.

COMPARATIVE EXAMPLE 1

$LiNi_{1/3}Co_{1/3}Mn_{1/3}O_2$ (NCM) was used as a positive active material.

EXAMPLE 2

NCA coated with LZMTP was manufactured by adding $LiNi_{87.5}Co_{11}Al_{1.5}O_2$ (NCA) to the LZMTP-containing solution according to Preparation Example 1, agitating the mixture, drying it at 120° C. while still agitated, and fired at 750° C. for 120 minutes for an inert gas atmosphere. Herein, the LZMTP was used in an amount of 1 part by weight based on 100 parts by weight of the NCA.

COMPARATIVE EXAMPLE 2

$LiNi_{87.5}Co_{11}Al_{1.5}O_2$ (NCA) was used as a positive active material.

COMPARATIVE EXAMPLE 3

LATP-coated NCA was manufactured according to the same method as Example 1 except for using the LATP according to Comparative Preparation Example 1 instead of the LZMTP according to Preparation Example 1.
(Manufacture of Rechargeable Lithium Battery Cell)

94 wt % of each of the positive active materials according to Examples 1 and 2 and Comparative Examples 1 to 3, 3 wt % of polyvinylidene fluoride (PVDF) and 3 wt % of carbon black were dispersed into N-methyl-2-pyrrolidone, thereby preparing slurry. The slurry was coated on a 15 μm-thick aluminum foil as a current collector and then, dried and compressed, thereby manufacturing a positive electrode.

Then, a metal lithium was used as a counter electrode for the positive electrode, thereby manufacturing a coin-type half-cell. Herein, an electrolyte solution was prepared by mixing ethylene carbonate (EC), ethylmethyl carbonate (EMC) and diethyl carbonate (DEC) in a volume ratio of 3:6:1; and dissolving 1.15M $LiPF_6$ in the mixed solvent.
Evaluation 1: SEM Photograph of Lithium Metal Phosphate FIGS. 2A and 2B are 10,000 and 30,000 magnified scanning electron microscope (SEM) photographs of the lithium metal phosphate according to Preparation Example 1.

Figure 2A:
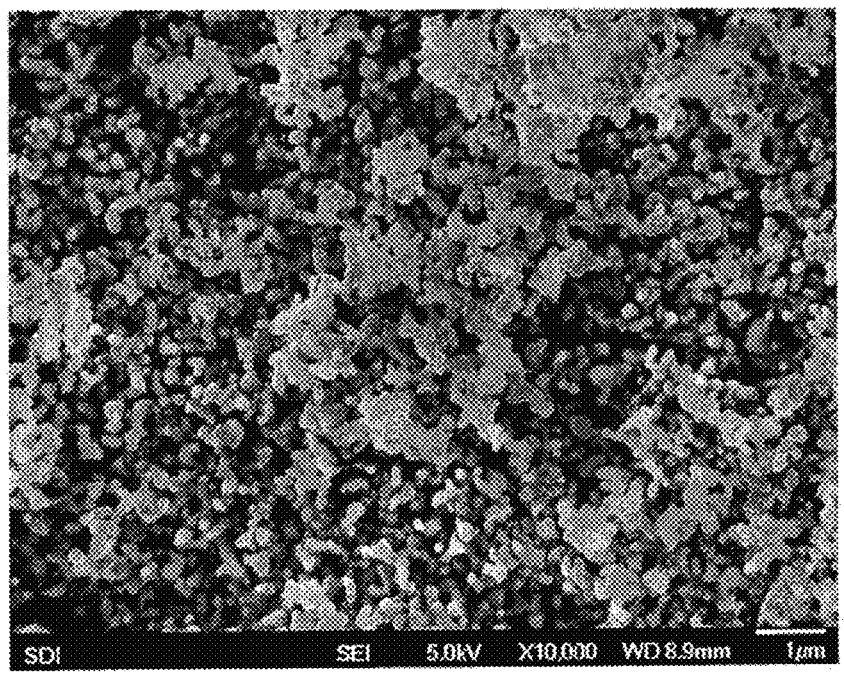
FIGS. 2A and 2B are 10,000 and 30,000 magnified scanning electron microscope (SEM) photographs of the lithium metal phosphate according to Preparation Example 1.
Figure 2B:
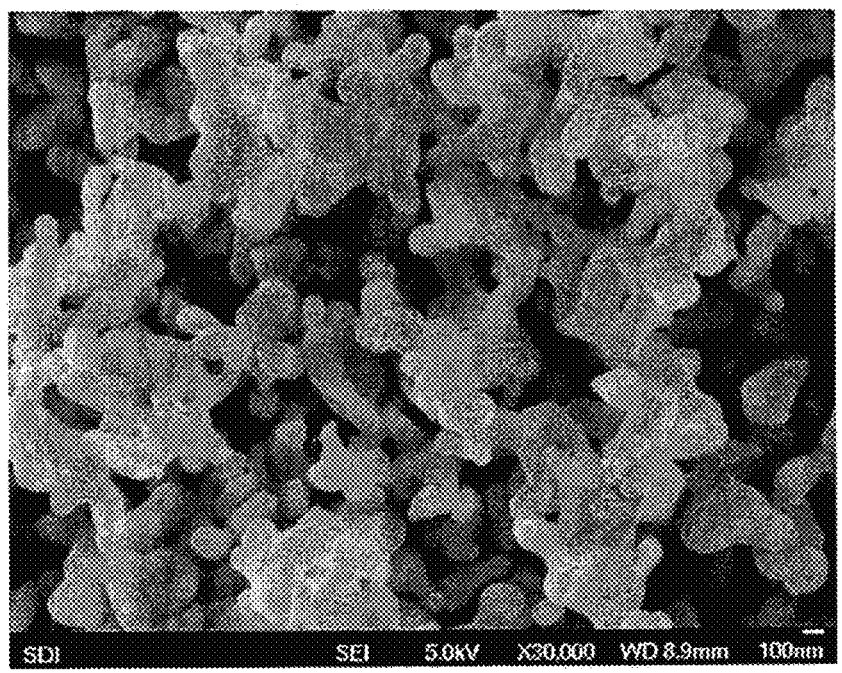
Figure 3A:
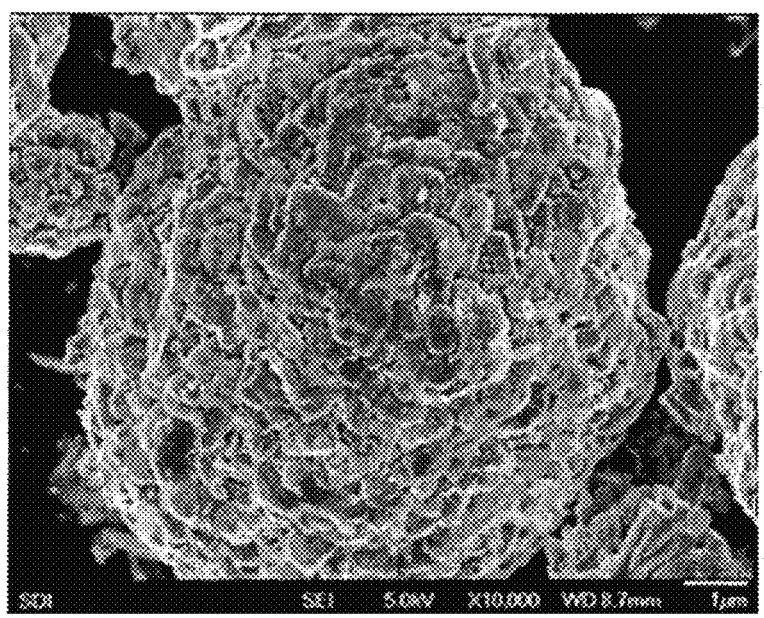
FIGS. 3A and 3B are 10,000 and 30,000 magnified scanning electron microscope (SEM) photographs of the positive active material according to Example 1.
Figure 3B:
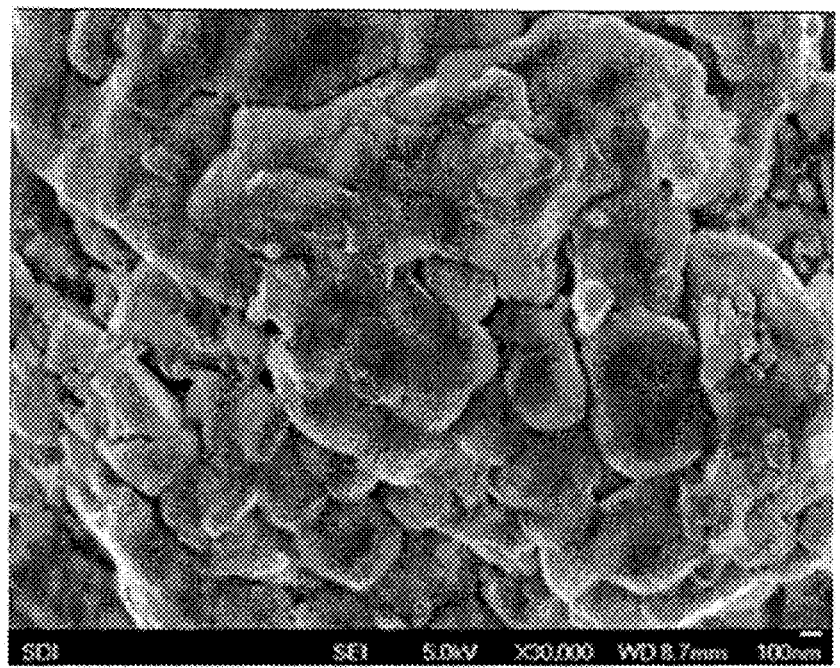
Figure 4A:
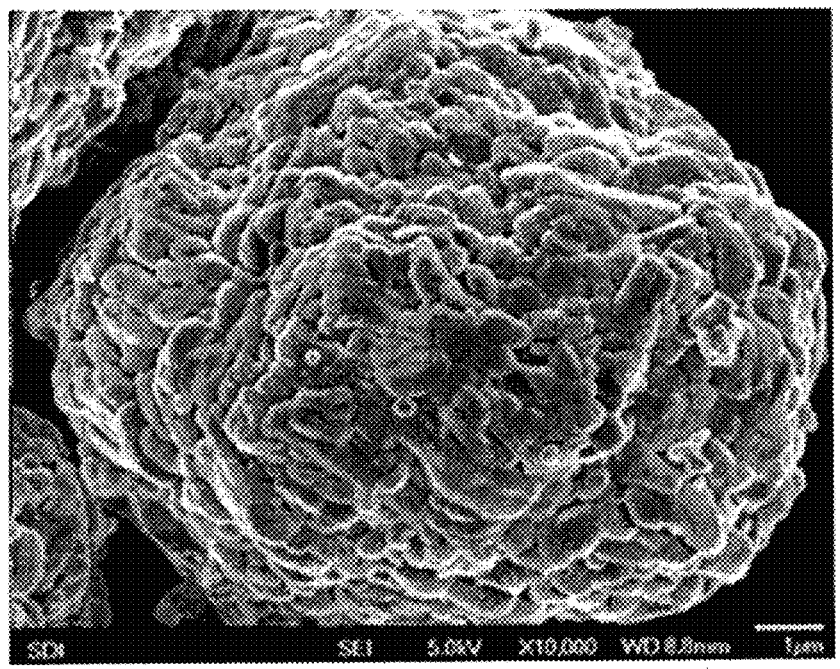
FIGS. 4A and 4B are 10,000 and 30,000 magnified scanning electron microscope (SEM) photographs of the positive active material according to Comparative Example 1.
Figure 4B:
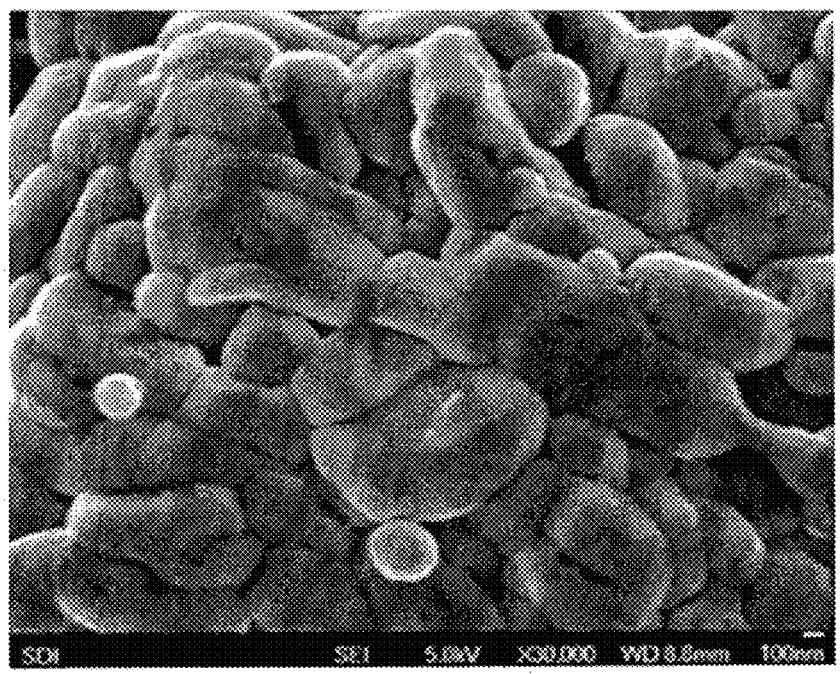

Referring to FIGS. 2A and 2B, lithium metal phosphate of LZMTP was manufactured according to Preparation Example 1.
Evaluation 2: SEM Photograph of Positive Active Material FIGS. 3A and 3B are 10,000 and 30,000 magnified scanning electron microscope (SEM) photographs of the positive active material according to Example 1. FIGS. 4A and 4B are 10,000 and 30,000 magnified scanning electron microscope (SEM) photographs of the positive active material according to Comparative Example 1.

Referring to FIGS. 3A to 4B, the positive active material according to Example 1 was formed of the NCM coated with the LZMTP on the surface.
Evaluation 3: XRD Analysis of Positive Active Material FIG. 5 is a graph showing an X-ray diffraction (XRD) analysis of the positive active material according to Example 1.

Figure 5:
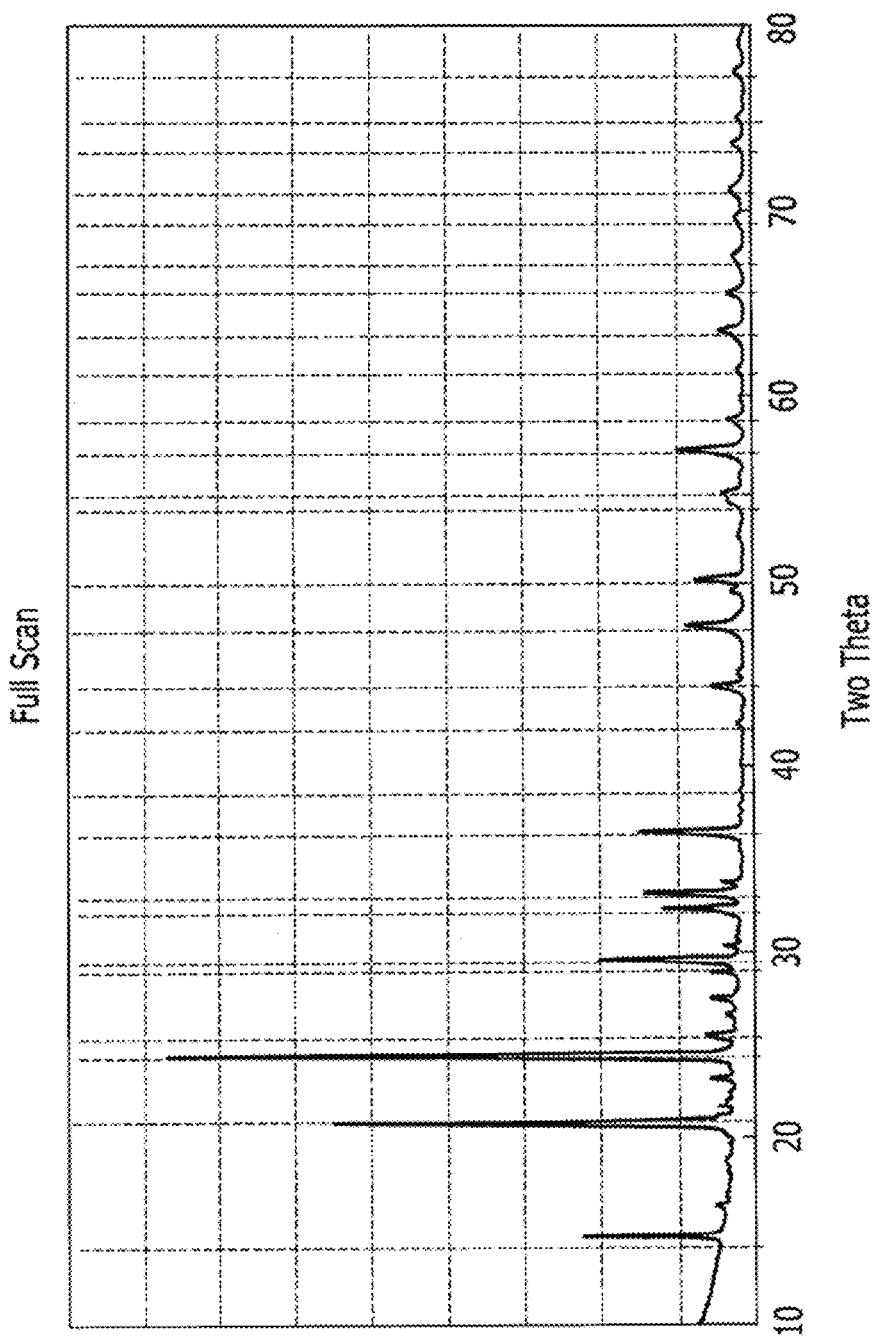
FIG. 5 is a graph showing an X-ray diffraction (XRD) analysis of the positive active material according to Example 1.

Referring to FIG. 5, a main peak shown in a range of 23.5° to 25.5° indicates $Li_{1.5}Zr_{0.2}Mg_{0.3}Ti_{1.5}(PO_4)_3$ having a NASICON structure.
Evaluation 4: DSC Analysis of Positive Active Material The coin cells according to Example 2 and Comparative Example 2 were decomposed in a full charge state at 4.5 V to take only positive electrode therefrom, and the positive electrode were dipped in dimethyl carbonate (DMC) to remove lithium salts and dried, thereby preparing positive electrode plates. The aluminum (Al) current collector was removed from the positive electrode, 5 mg of the resulting positive electrode was put in a pressure pan for DSC, 2 μl of the same electrolyte solution as the electrolyte solution used in the coin cells was injected therein, the pressure pan was well closed to measure DSC of positive active materials. The results are provided in FIG. 6.

Figure 6:
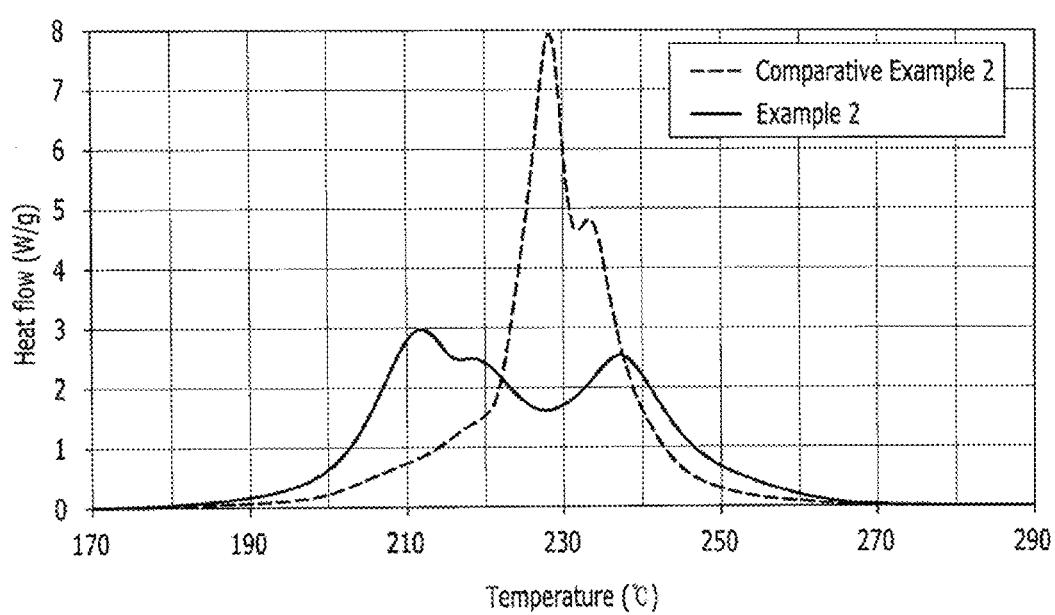
FIG. 6 is a graph showing DSC (differential scanning calorimetry) analyses of the positive active materials according to Example 2 and Comparative Example 2.

FIG. 6 is a graph showing DSC (differential scanning calorimetry) analyses of the positive active materials according to Example 2 and Comparative Example 2.

Referring to FIG. 6, Example 2 using the LZMTP-coated NCA as a positive active material showed a decreased exothermic amount compared with Comparative Example 2 using NCA as a positive active material. Accordingly, a core material coated with lithium metal phosphate including a tetravalent element and a divalent element as a positive active material may contribute to thermal safety of a rechargeable lithium battery cell compared with an uncoated core material.
Evaluation 5: Impedance of Rechargeable Lithium Battery Cell The positive electrodes according to Example 2 and Comparative Examples 2 and 3 were cut into a size of 3×5 cm, and a three-electrode pouch-type cells were respectively manufactured by closely positioning a lithium metal at the front and the back of the cut electrode while being interposed by a separating film therebetween, fixing them with a Teflon plate, inserting the same electrolyte solution as the electrolyte solution used in the coin cell into a pouch, and sealing the pouch by heating each side of the pouch.

The three-electrode pouch cells were used to measure impedance in a range of 100 KHz to 10 mHz at a unit of 10 mV. The results are provided in FIGS. 7A and 7B.

Figure 7A:
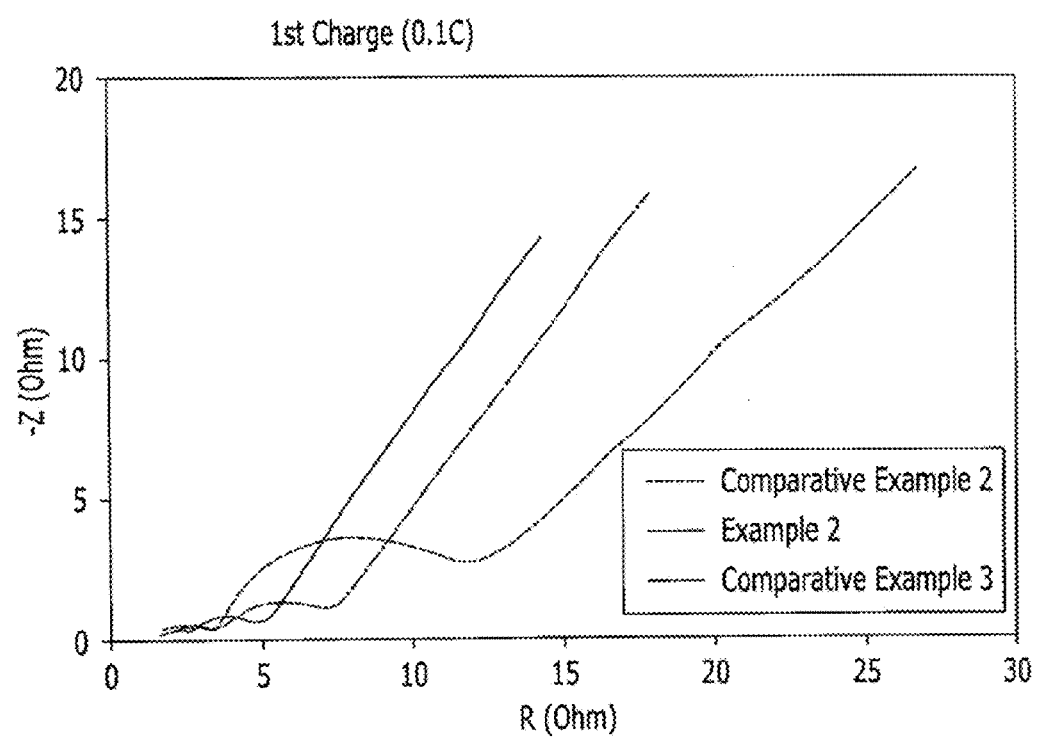
FIGS. 7A and 7B are graphs showing impedance of the rechargeable lithium battery cells including the positive active materials according to Example 2 and Comparative Examples 2 and 3 when the cells were charged at 0.1 C for a first charge and at 1 C for a 15$^{th}$ charge.
Figure 7B:
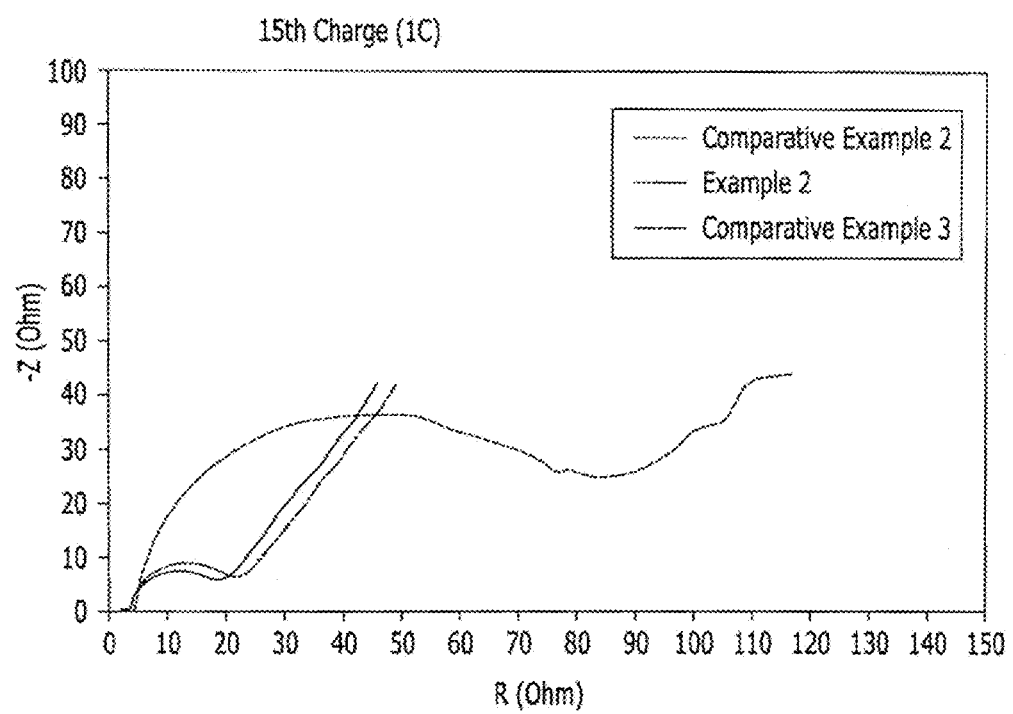

FIGS. 7A and 7B are graphs showing impedance of the rechargeable lithium battery cells respectively including the positive active materials according to Example 2 and Comparative Examples 2 and 3 when the cells were charged at 0.1 C for the first charge and at 1 C for the $15^{th}$ charge.

Referring to FIGS. 7A and 7B, Example 2 using the LZMTP-coated NCA as a positive active material showed a larger decrease in the entire resistance including interface resistance compared with Comparative Example 2 using NCA and Comparative Example 3 using the LATP-coated NCA. Also, the resistance according to Example 2 showed a decrease at a more extreme level than that according to Comparative Example 3 as cycles were repeated.
Evaluation 6: Efficiency of Rechargeable Lithium Battery Cell Efficiency of rechargeable lithium battery cells respectively using the positive active materials according to Example 2 and Comparative Example 2 was measured, and the results are provided in FIGS. 8 and 9.

Figure 8:
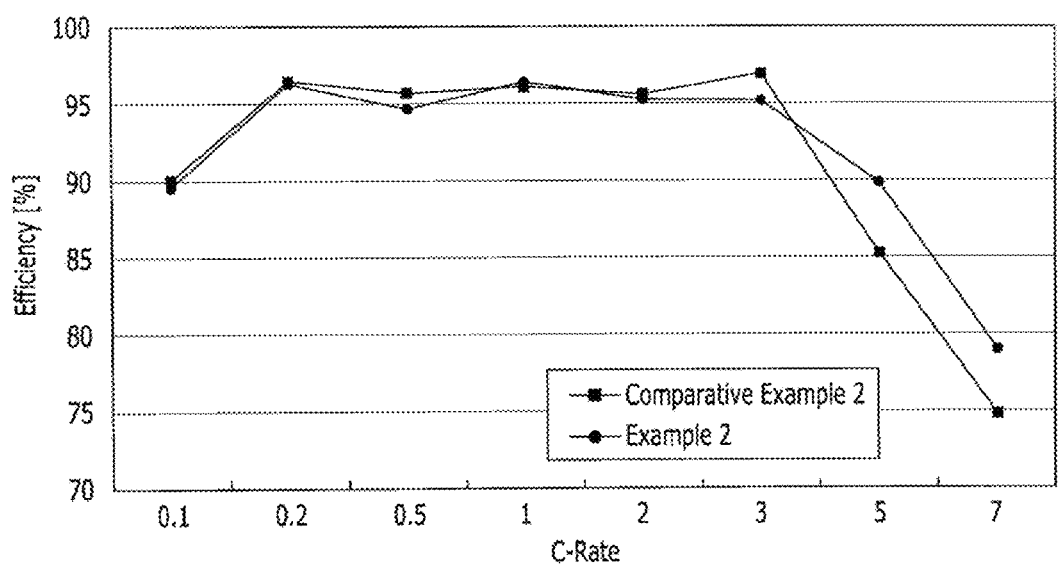
FIG. 8 is a graph showing efficiency depending on a C-rate of the rechargeable lithium battery cells including the positive active materials according to Example 2 and Comparative Example 2.

The results in FIG. 8 were obtained under the following conditions.

1: Charge: 0.1 C, 4.5V, 0.05 C cut-off/Discharge: 0.1 C, 3V cut-off
2. Charge: 0.2 C, 4.5V, 0.05 C cut-off/Discharge: 0.2 C, 3V cut-off
3. Charge: 0.5 C, 4.5V, 0.05 C cut-off/Discharge: 0.5 C, 3V cut-off
4. Charge: 1 C, 4.5V, 0.05 C cut-off/Discharge: 1 C, 3V cut-off
5. Charge: 2 C, 4.5V, 0.05 C cut-off/Discharge: 2 C, 3V cut-off
6. Charge: 3 C, 4.5V, 0.05 C cut-off/Discharge: 3 C, 3V cut-off
7. Charge: 5 C, 4.5V, 0.05 C cut-off/Discharge: 5 C, 3V cut-off
8. Charge: 7 C, 4.5V, 0.05 C cut-off/Discharge: 7 C, 3V cut-off The results in FIG. 9 were obtained by charging the cells at a current density of 1 C under a CCCV (constant current constant voltage) mode with a cut-off 4.5 V and 0.05 C and discharging the cells with current density of 1 C under a CC mode with a cut-off 3 V for 50 cycles.

Figure 9:
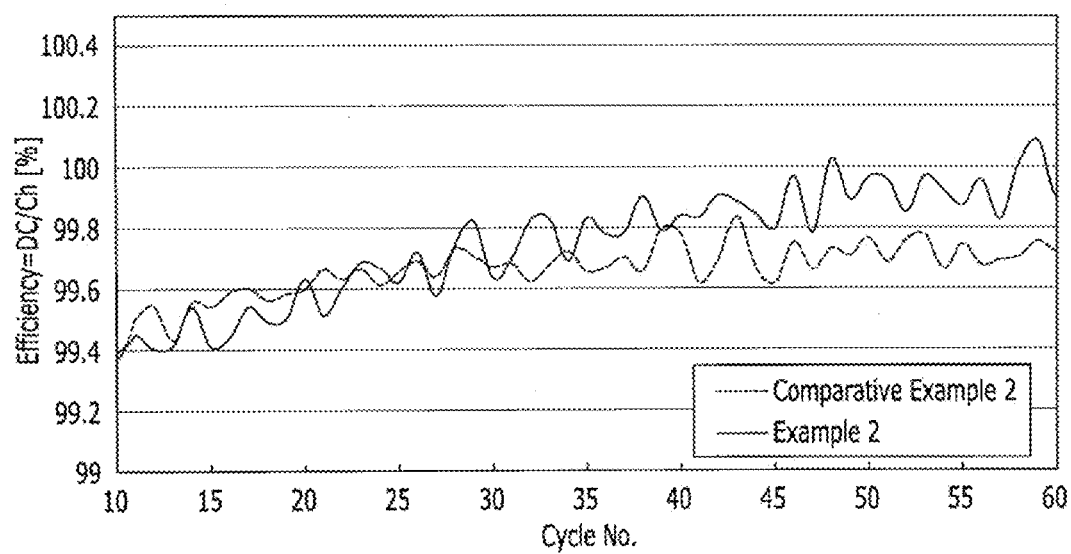
FIG. 9 is a graph showing efficiency depending on a cycle of the rechargeable lithium battery cells including the positive active materials according to Example 2 and Comparative Example 2.

FIG. 8 is a graph showing efficiency depending on a C-rate of the rechargeable lithium battery cells including the positive active materials according to Example 2 and Comparative Example 2, and FIG. 9 is a graph showing efficiency depending on a cycle of the rechargeable lithium battery cells including the positive active materials according to Example 2 and Comparative Example 2.

Referring to FIGS. 8 and 9, Example 2 using the LZMTP-coated NCA as a positive active material showed excellent charge and discharge efficiency characteristics at a higher rate and as the cycles increased compared with Comparative Example 2 using NCA. Accordingly, a core material coated with lithium metal phosphate including a tetravalent element and a divalent element as a positive active material may provide excellent efficiency characteristics for a rechargeable lithium battery cell compared with an uncoated core material.

Evaluation 7: Cycle-Life Characteristics of Rechargeable Lithium Battery Cell

Figure 10:
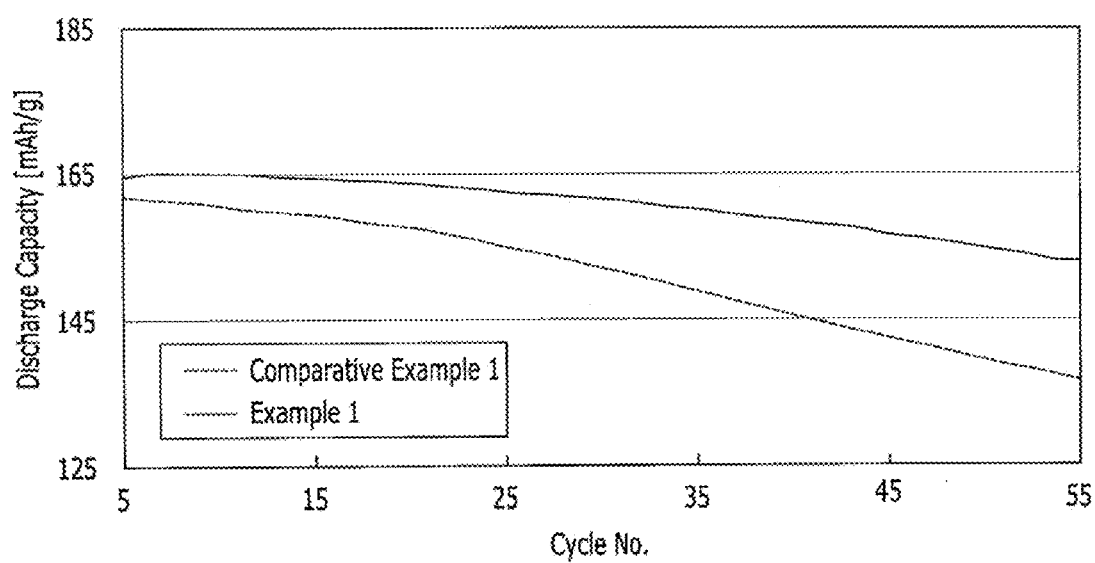
FIG. 10 is a graph showing cycle-life characteristics of rechargeable lithium battery cells including the positive active materials according to Example 1 and Comparative Example 1.

Cycle-life characteristics of the rechargeable lithium battery cells respectively using the positive active materials according to Example 1 and Comparative Example 1 were measured, and the results are provided in FIG. 10.

The charge of the cells was performed at 3 V up to 4.5 V under a CCCV mode and cut off at 0.05 C, and the discharge thereof was performed at 4.5 V under a CC mode and cut off at 3 V, and herein, a charge and discharge C-rate were in an order of 0.1 C 0.2 C, 0.5 C, 1 C, 2 C, 3 C, 5 C and 7 C. Subsequently, 50 cycles were performed by charging the cells at a current density of 1 C with a cut-off 4.5 V and 0.05 C and discharging the cells with current density of 1 C under a CC mode with a cut-off 3 V.

FIG. 10 is a graph showing cycle-life characteristics of rechargeable lithium battery cells respectively including the positive active materials according to Example 1 and Comparative Example 1.

Referring to FIG. 10, Example 1 using the LZMTP-coated NCM as a positive active material showed excellent cycle-life characteristics compared with Comparative Example 1 using NCM. Accordingly, the core material coated with lithium metal phosphate including a tetravalent element and a divalent element as the positive active material may provide excellent cycle-life characteristics for a rechargeable lithium battery cell compared with an uncoated core material.

Evaluation 8: Rate Capability of Cycle-Life Characteristics of Rechargeable Lithium Battery Cell Rate capability of rechargeable lithium battery cells respectively using the positive active materials according to Example 1 and Comparative Example 1 was measured, and the results are provided in FIG. 11.

The rate capability was measured by charging the cells a 3 V up to 4.5 V under a CCCV mode with a cut-off of 0.05 C and discharging the cells at 4.5 V under a CC mode with a cut-off of 3 V, and herein, a charge and discharge C-rate were in an order of 0.1 C 0.2 C, 0.5 C, 1 C, 2 C, 3 C, 5 C and 7 C.

Figure 11:
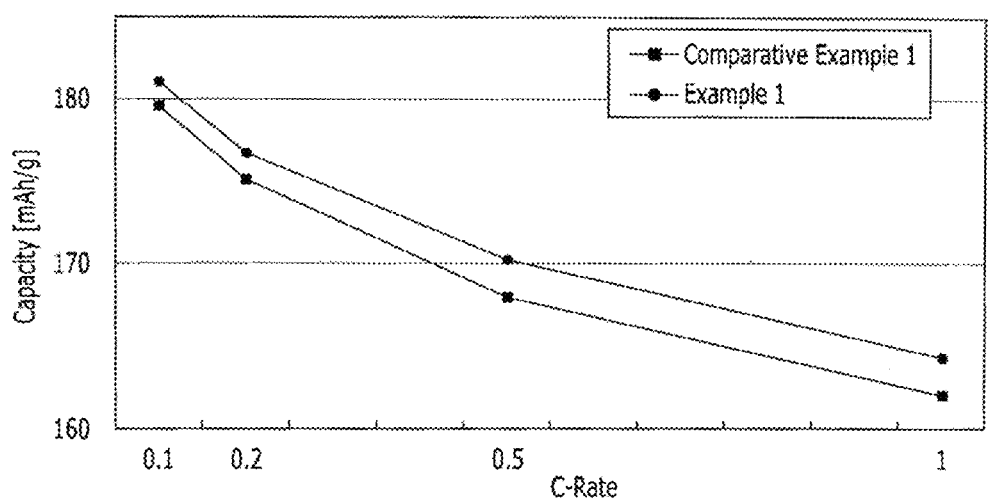
FIG. 11 is a graph showing rate capability of rechargeable lithium battery cells including the positive active materials according to Example 1 and Comparative Example 1.

FIG. 11 is a graph showing the rate capability of the rechargeable lithium battery cells respectively using the positive active materials according to Example 1 and Comparative Example 1.

Referring to FIG. 11, Example 1 using the LZMTP-coated NCM as a positive active material showed excellent rate capability compared with Comparative Example 1 using NCM. Accordingly, a core material coated with lithium metal phosphate including a tetravalent element and a divalent element as a positive active material may provide excellent rate capability for a rechargeable lithium battery cell compared with an uncoated core material.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material for a rechargeable lithium battery, comprising:
   a core comprising a compound capable of intercalating and deintercalating lithium; and
   a lithium metal phosphate on the surface of the core, wherein the lithium metal phosphate is different from the compound capable of intercalating and deintercalating lithium and is represented by Chemical Formula 1:

$$Li_{1+(x+y)}A_xB_yTi_{2-(x+y)}(PO_4)_3 \quad \text{Chemical Formula 1}$$

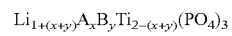

wherein in Chemical Formula 1, A is a tetravalent element selected from the group consisting of Zr, Nb, Mo, Ce, Cr, Ge, Ru, Se, Sn, Ta, Tb, W, and a combination thereof, B is a divalent element, $0<x\leq1$, $0<y\leq1$, and $2-(x+y)$ is not 0.

2. The positive active material of claim 1, wherein in Chemical Formula 1,
   B is Mg, Zn, Cu, Ca, Sr, Ba, Ca, Cd, Fe, Mn, Nd, Yb, Zn, or a combination thereof.

3. The positive active material of claim 1, wherein in Chemical Formula 1, $0<x<1$ and $0<y<1$.

4. The positive active material of claim 1, wherein the lithium metal phosphate is attached to the surface of the core in a shape of an island.

5. The positive active material of claim 1, wherein the lithium metal phosphate is included in an amount of about 0.01 parts by weight to about 20 parts by weight based on 100 parts by weight of the compound capable of intercalating and deintercalating lithium.

6. The positive active material of claim 1, wherein the compound capable of intercalating and deintercalating lithium is a nickel-based oxide.

7. The positive active material of claim 6, wherein the nickel-based oxide comprises a lithium nickel cobalt oxide, a lithium nickel cobalt aluminum oxide, a lithium nickel cobalt manganese oxide, or a combination thereof.

8. A rechargeable lithium battery comprising the positive active material of claim 1.

9. The rechargeable lithium battery of claim 8, wherein in Chemical Formula 1,
   B is Mg, Zn, Cu, Ca, Sr, Ba, Ca, Cd, Fe, Mn, Nd, Yb, Zn, or a combination thereof.

10. The rechargeable lithium battery of claim 8, wherein in Chemical Formula 1, $0<x<1$ and $0<y<1$.

11. The rechargeable lithium battery of claim 8, wherein the lithium metal phosphate is attached to the surface of the core in a shape of an island.

12. The rechargeable lithium battery of claim 8, wherein the lithium metal phosphate is included in an amount of about 0.01 parts by weight to about 20 parts by weight based on 100 parts by weight of the compound capable of intercalating and deintercalating lithium.

13. The rechargeable lithium battery of claim 8, wherein the compound capable of intercalating and deintercalating lithium is a nickel-based oxide.

14. The rechargeable lithium battery of claim 13, wherein the nickel-based oxide comprises a lithium nickel cobalt oxide, a lithium nickel cobalt aluminum oxide, a lithium nickel cobalt manganese oxide, or a combination thereof.

15. A method of preparing the positive active material for a rechargeable lithium battery of claim 1, the method comprising
- mixing a lithium-containing compound, a tetravalent element-containing compound, a divalent element-containing compound, a titanium-containing compound, a phosphate salt and a solvent to prepare a solution comprising the lithium metal phosphate represented by Chemical Formula 1;
- adding the compound capable of intercalating and deintercalating lithium to the solution comprising the lithium metal phosphate to obtain a mixture; and
- drying and firing the mixture.

\* \* \* \* \*